Figure 1:
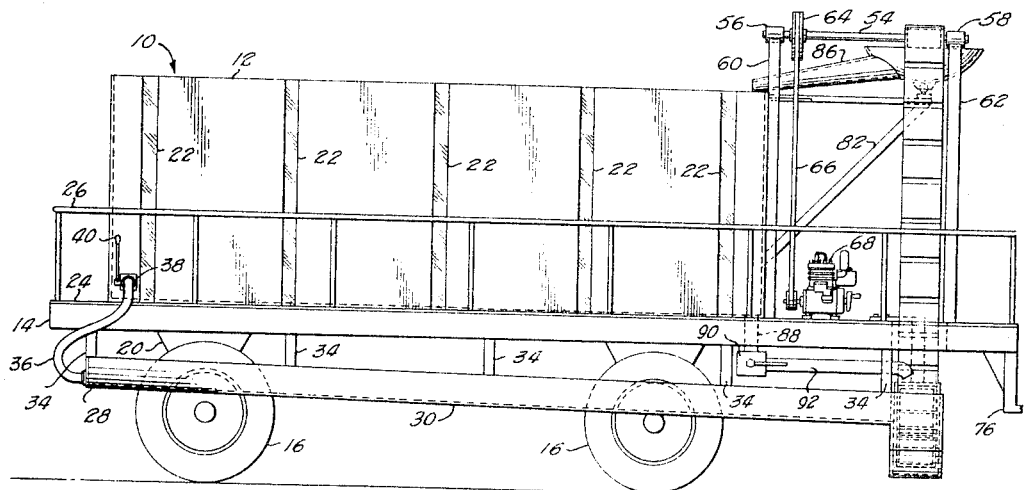

Aug. 30, 1966  T. H. FRICKS  3,269,099

APPARATUS AND METHOD OF HARVESTING BERRIES

Filed May 27, 1964

INVENTOR
Truman H. Fricks

BY

ATTORNEY

United States Patent Office 3,269,099
Patented August 30, 1966

3,269,099
APPARATUS AND METHOD OF HARVESTING BERRIES
Truman H. Fricks, 1302 Rains St., Arlington, Tex.
Substituted for abandoned application Ser. No. 196,792, May 22, 1962. This application May 27, 1964, Ser. No. 372,446
9 Claims. (Cl. 56—1)

The present invention relates to apparatus for harvesting fruit and more particularly to a novel method and apparatus for harvesting fruit which grows upon vines that can be trained to grow on a trellis such as blackberries.

Increased labor costs have greatly affected the agricultural economy of the country. In an effort to combat the rising labor cost, certain segments of agriculture have become very highly mechanized. Thus, the production of certain farm products, such as cotton, corn, many small grains and other products, is mechanized to a very high degree. On the other hand, certain areas of the farm economy are not so readily adaptable to a mechanized type of operation. Thus, production of berries and other fruit has not been successfully mechanized and, as the result of the greatly increased labor costs, in many regions of the country the berry industry has virtually vanished.

According to the present invention, an improved method and apparatus for harvesting berries, particularly blackberries, is provided. In practicing the present invention, the trellises upon which the berry vines grow are inclined to facilitate the catching of the fruit which is threshed from the vines by suitable means such as a compressed air vibrator. As the fruit falls from the vines on which it grows, it is allowed to fall into a trough containing running water or otherwise directed into the trough. Once the fruit arrives in the trough, it is handled thereafter by the movement of water containing the fruit in suspension thereby allowing large amounts of fruit to be handled quickly and without damage.

In accordance with one specific embodiment of the invention, a large tank containing water is mounted upon wheels to allow it to be either propelled by its own motive means or else pulled by a tractor or truck. A trough is mounted along two adjacent sides of the tank. The trough is at a relatively low elevation and extends outward from the large tank such that it will extend underneath the vines on which the fruit grows, and when the fruit is threshed from the vines it will fall into the trough. The trough slopes slightly in one direction such that when water is admitted to the upper end of the trough it will flow along the trough washing the berries which fall into the trough with it. A conveyor belt is mounted along the back of the tank for purpose of transporting the water containing the berries in suspension into the tank. The action of the conveyor belt and the valve which regulates the flow of water into the trough is synchronized such that the amount of water removed from the trough by the conveyer belt is equal or substantially equal to the amount of water being admitted to the trough through the valve. The berries fed into the tank of water will remain in a state of semi-suspension in the water and not settle to the bottom of the tank. The water provides a cushion to prevent damage to the berries, and it has been discovered that emersion of the berries in the water does not produce an appreciable absorption of water such as would make the berries undesirable. Due to the cushioning effect of the water, a large amount of berries can be placed in the tank.

Figure 2:
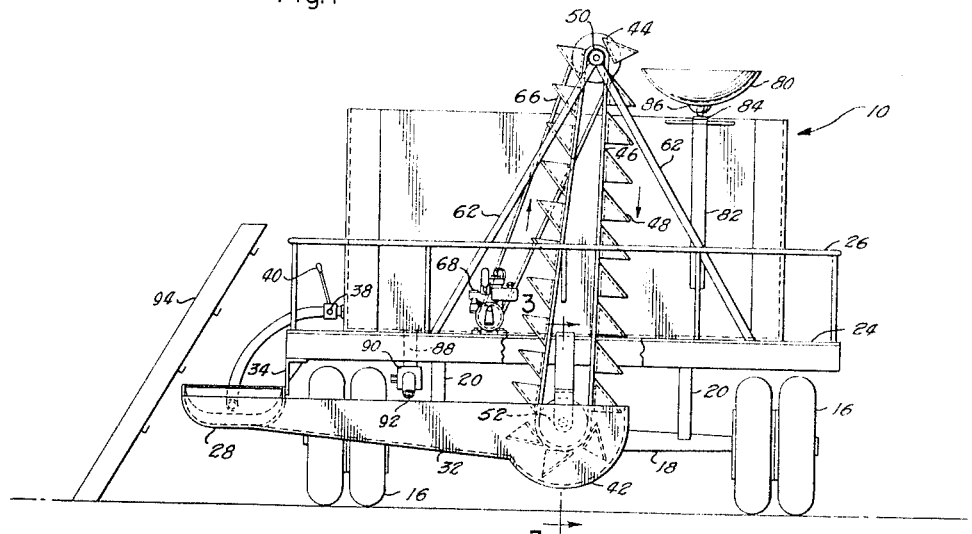
Figure 3:
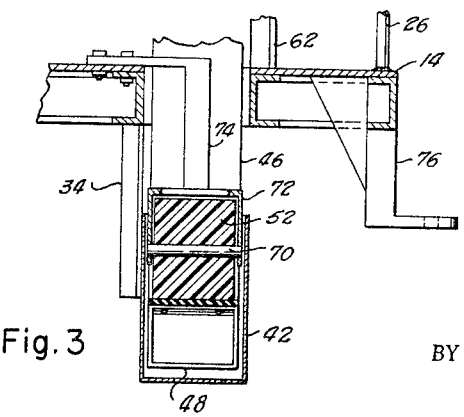

Many objects and advantages of the invention will become readily apparent to those skilled in the art as the following detailed description of the same unfolds when taken in conjunction with the appended drawings wherein like reference numerals denote like parts and in which:

FIGURE 1 is a side elevation view illustrating the apparatus provided by the present invention;

FIGURE 2 is an elevation view of the rear of the apparatus provided by the present invention further illustrating the relationship between the apparatus and the trellises on which the berries to be gathered grow when the apparatus is in use; and FIGURE 3 is an enlarged view in cross section taken along line 3—3 of FIGURE 2 illustrating the preferred manner for tensioning the lower end of the conveyor belt utilized in the present invention.

Turning now to the drawings, the apparatus provided by the present invention is denoted generally by the referenced numeral 10. The apparatus 10 includes a large tank 12 that may be mounted on a platform 14. The platform 14 is mounted on an arrangement of wheels 16 and axles 18 by supports 20 in the method well known in the art.

The tank 12 may be formed of steel, aluminum, fiber glass or other suitable materials. At spaced points along the wall of the tank, panels 22 of suitable transparent material are provided. The transparent panels 22 are not necessary, but are desirable for reasons that will become apparent as the description of the invention unfolds. The tank 12 is preferably somewhat smaller than the platform 14 to provide a cat walk 24 around the periphery of the tank in which the operator of the apparatus can stand and move. A railing 26 may be provided as a protective feature to prevent the operator falling from the platform 14.

A trough 28 is also provided. The trough 28 includes a portion 30 which extends along the side of the platform 14 and a portion 32 which extends along a portion of the rear of the platform 14. The trough 28 may be connected to the platform 14 by supports 34. The trough 28 is connected to the platform 14 in such a manner that the portion 30 of the trough 28 slopes downwardly toward the portion 32. A conduit 36 provides communication between the tank 12 and the trough 28 to allow the water to flow from the tank into the trough. The flow of water from the tank to the trough 28 is controlled by valve 38 which is provided with a handle 40 for purposes of opening and closing same. A removable screen (not shown) may be provided to cover the inlet to the valve 38 and prevent the fruit in the tank flowing into trough 38.

The rear portion 32 of the trough 28 includes a sump portion 42 in which a conveyor belt 44 turns and moves. The conveyor belt 44 is of conventional type and may include a rubber belt 46 on which a plurality of buckets 48 are mounted. An upper roller 50 and a lower roller 52 are provided for tensioning the conveyor belt 44. The diameter of the lower roller 52 is such that the buckets 48 mounted on the conveyor belt will barely clear the walls of the sump region 42 of the trough 28. The upper roller 50 of the conveyor belt 44 is of relatively small diameter such that as the buckets travel over the top of the roller 50 they will be emptied very quickly.

The upper roller 50 is mounted on a shaft 54 which is journaled for rotation in bearings 56 and 58. The bearing 56 is mounted on braces 60 and the bearing 58 is mounted in similar fashion on the brackets 62. A pulley wheel 64 is also mounted on the shaft 54. The pulley 64 is driven through a continuous belt 66 by a small gasoline engine 68 or other suitable means.

As best seen in FIGURE 3, a portion of the platform 14 is cut away to allow the conveyor belt 44 to extend through the bed 14 of the trailer and into the sump portion 42 of the trough 28. The roller 52 which tensions the lower portion of the conveyor belt 44 is journaled for rotation about a shaft 70. The shaft 70 is connected to a U-shaped mounting bracket 72 which is connected to the bed 14 of the trailer by support 74. The rolling contact between the roller 52 and the shaft 70 is lubricated by the water contained within the trough. It is preferred that the shaft 70 not extend through the wall of the trough 28 as it would normally require the presence of a grease seal. The presence of grease or other oils in the water will adversely affect the berries which are being harvested by the apparatus. FIGURE 3 also illustrates the step 76 which is provided for gaining access to the bed 14 of the trailer on which the apparatus is mounted.

As the motor 68 drives the shaft 54, it will cause the conveyor belt 44 to move in the direction indicated by the arrows. Thus, as the buckets 48 move in the sump portion 42 of the trough 28 they will pick up water containing the berries which have been harvested from the trough 28 and carry it to the top of the roller 50. As the buckets 48 pass over the top of roller 50, they are inverted and the contents of buckets 48 will spill out into the dish shaped container 80. It is practical for the conveyer belt 44 to be inclined toward the container 80 to insure that the contents of the buckets 48 are emptied into the container 80.

The dish shaped container 80 is mounted on the mounting brace 82 for rotation in a horizontal plane by a ball and socket joint 84. The container 80 includes a spout portion 86 which normally extends over the wall of the tank 12 such that the water and berries emptied into the container 80 will flow into the tank 12. As the container 80 is rotatable, it may be turned such that the spout 86 will direct the water containing the berries that have been harvested in any other direction also.

A drain pipe 88 that communicates with the tank 12 is also provided. The opening of the drain pipe 88 should be flush with the bottom of the tank 28 and, preferably, the bottom of the tank 12 may be recessed in the region of the pipe 88. A valve 90 controls the flow of material through pipe 88. The outlet of valve 90 is connected to pipe 92 which feeds into the trough 28.

For best results, it is desirable that the apparatus provided by the present invention be used in harvesting berries which are grown on trellises which are inclined in the manner shown in FIGURE 2. If the berries are grown on such trellises, virtually all of the fruit will depend from the vines on the inclined side of the trellis and, as illustrated in FIGURE 2, the trough 28 may extend completely beneath the trellis such that virtually all of the fruit which is removed from the vines by vibration or other similar means will fall into the trough.

In operation of the apparatus 10 provided by the present invention, the apparatus is moved along a path parallel to the trellis on which the berries to be gathered grow. The apparatus 10 may be moved either by truck or tractor or the apparatus 10 may be provided with its own motive force. The apparatus 10 is positioned relative to the trellis 94 on which the fruit to be gathered grows such that the trough 28 extends underneath the trellis 94 as shown in FIGURE 2. It is to be appreciated that the drawings provided herein are for illustration only and are not to scale and that it is practical for the trough 28 to be positioned very close to the ground such that virtually all of the berries to be gathered will be above the trough.

The tank 12 is filled approximately one-half full of water prior to the time the harvesting operation begins. As the apparatus is brought into position adjacent the trellis on which the berries grow, the valve is opened to allow water to flow into the trough 28. The engine 68 is also started, causing the conveyor belt to move, picking water out of the trough 28 and transporting it into the container from which it is directed into the tank. The speed of the conveyor belt 44 and the opening of the valve 38 are adjusted such that the amount of water removed from the trough 28 by the conveyor belt 44 is substantially equal to the amount of water admitted to the trough 28 by the valve 38 and conduit 36. The operator then moves along the catwalk 24, threshing the berries from the vines which grow on the trellises. To this end, the gasoline engine 68 may also be utilized to drive an air compressor (not shown) which would furnish pneumatic pressure for a penumatic vibrator. Any suitable means for threshing the berries from the vines may be used, however.

As the berries are threshed from the vines, they will fall into the trough 28 in which the water flows. The specific gravity of the berries is such that they will not float in the water nor will they settle completely to the bottom, rather remaining in a state of semi-suspension. The berries will flow with the water along the trough 28 and be picked up by the buckets 48 of the conveyor belt 44 as the conveyor belt 44 is driven. As the buckets 48 empty into the container 80, the water containing the berries in suspension will be directed by the spout 86 into the water filled tank 12. At such time as all of the berries have been threshed from the vines adjacent the apparatus 10, the apparatus 10 will be moved parallel to the trellises 88 one length such that the trough 28 will again underlie the vines containing berries, and the process will be repeated. Alternatively, if the apparatus 10 is moved very slowly, it is possible to thresh the berries from the vines such that they fall into the trough 28 without the necessity for completely stopping the forward motion of the apparatus 10.

The flow of water through the valve 38 will tend to cause the berries directed into the tank 12 to be evenly distributed. However, if the harvest is heavy, there will be some tendency for the berries to concentrate in the region immediately beneath the spout 86. The transparent panels 22 provided in the tank 12 allow the operator to observe the distribution of the berries within the tank and, if necessary, distribute them evenly throughout the tank by using a pole or rake or other similar means. As the berries are at all times suspended in the water, there will always be a small amount of water cushioning one berry from the other and preventing the crushing of any berries. At such time as the amount of fruit in the tank increases to the point where it is apparent that there is some danger of crushing action, the tank should be unloaded.

The unloading operation is accomplished by opening the valve 90 to allow the water and berries in the tank 12 to flow into the trough 28. The conveyer belt 44 is operative to remove the berries and water from the trough 28 and empty them into the container 80. The container 80 is turned in such direction that the spout 86 is directed away from the tank 12 and into suitable containers at the central storage area. At the time the tank is being emptied, it is practical to run the water containing the berries over a screen to separate the berries from the water and allow the berries to be directed into suitable size containers for further shipment or storage.

It is noteworthy that in the course of the entire harvesting operation utilizing the apparatus of the present invention, it is never necessary that the berries be handled manually. All handling of the berries is accomplished by moving water in which the berries are in suspension thereby minimizing the danger of damaging the berries. In addition, certain beneficial cleaning action is accomplished. As the entire operation is mechanized to a considerable degree, it is possible for the harvesting cost to be reduced considerably as one or two men can achieve results that would require the efforts of many more people in the absence of the present invention.

Although it is most desirable that the vines be trained to grow on trellises which are inclined in the manner shown from the first planting, it is practical for existing trellises to be modified to the manner shown.

Many changes and modifications to the present invention will occur to those skilled in the art in view of the foregoing description of the same. The invention is not to be limited to what has been shown herein but only as necessitated by the scope of the appended claims.

What I claim is:

1. In a growing and harvesting apparatus wherein a trellis for berries is located along and at least partially over the path of travel of the harvesting apparatus, said harvesting apparatus comprising:
   (1) a tank adapted to contain water;
   (2) means supporting said tank for movement along the ground;
   (3) a trough;
   (4) means connecting said trough to said means supporting said tank whereby at least a portion of said trough extends beneath the berries to be harvested such that berries threshed from a vine fall into said trough;
   (5) means for controlling the flow of water into said trough from said tank;
   (6) and means for transporting the water and berries in said trough into said tank.

2. Apparatus as defined in claim 1 wherein said trough slopes toward said means for transporting the water and berries.

3. Apparatus as defined in claim 2 wherein said means for transporting comprises a conveyer belt having a plurality of buckets formed thereon.

4. Apparatus as defined in claim 3 wherein said conveyer belt is tensioned at its lower end by a water lubricated roller.

5. Apparatus as defined in claim 3 wherein said conveyer belt empties into a container having a spout, said container being rotatably mounted whereby said spout can be directed into said tank and away from said tank.

6. Apparatus as defined in claim 2 wherein said trough extends along two adjacent sides of said tank.

7. Apparatus as defined in claim 3 wherein said trough includes a sump portion in which said conveyer belt moves.

8. Apparatus as defined in claim 1 wherein said means for controlling the flow of water from said tank into said trough comprises a valve.

9. The method of harvesting berries that comprises:
   (1) growing the berries on trellises that slant at an angle to allow a movable trough to pass under the berries to be harvested;
   (2) positioning said movable trough beneath the berries to be harvested;
   (3) causing water to flow in said trough;
   (4) separating the berries from the vine on which they grow to allow them to fall into the water flowing in said trough; and
   (5) transporting the water containing the berries in suspension from said trough into a tank.

References Cited by the Examiner

UNITED STATES PATENTS

| | | | |
|---|---|---|---|
| 1,437,006 | 11/1922 | Otterson | 214—83.28 X |
| 1,512,561 | 10/1924 | Oliphant | 134—99 |
| 2,347,437 | 4/1944 | Saxe | 214—17 X |

GERALD M. FORLENZA, *Primary Examiner.*

ALBERT J. MAKAY, *Assistant Examiner.*